(12) United States Patent
Mauritzen et al.

(10) Patent No.: US 12,545,371 B2
(45) Date of Patent: Feb. 10, 2026

(54) SYSTEM AND METHOD FOR TRANSMITTING SUBSEA PARAMETERS

(71) Applicant: Ocean Access AS, Trondheim (NO)

(72) Inventors: Andreas Mauritzen, Trondheim (NO); Fredrik Lilleøkdal, Trondheim (NO)

(73) Assignee: Ocean Access AS, Trondheim (NO)

( * ) Notice: Subject to any disclaimer, the term of this patent is extended or adjusted under 35 U.S.C. 154(b) by 391 days.

(21) Appl. No.: 18/547,422

(22) PCT Filed: Feb. 23, 2022

(86) PCT No.: PCT/NO2022/050049
§ 371 (c)(1),
(2) Date: Aug. 22, 2023

(87) PCT Pub. No.: WO2022/182246
PCT Pub. Date: Sep. 1, 2022

(65) Prior Publication Data
US 2024/0124099 A1    Apr. 18, 2024

(30) Foreign Application Priority Data

Feb. 23, 2021 (NO) .................................. 20210235

(51) Int. Cl.
| | | |
|---|---|---|
| *B63B 22/18* | (2006.01) | |
| *B63B 22/00* | (2006.01) | |
| *B63B 22/06* | (2006.01) | |

(52) U.S. Cl.
CPC .............. *B63B 22/18* (2013.01); *B63B 22/06* (2013.01); *B63B 2022/006* (2013.01)

(58) Field of Classification Search
CPC .... B63B 22/18; B63B 22/06; B63B 2022/006
See application file for complete search history.

(56) References Cited

U.S. PATENT DOCUMENTS 3,256,539 A * 6/1966 Clark ...................... B63B 22/22
367/130
5,129,848 A   7/1992 Etheridge et al.
(Continued)

FOREIGN PATENT DOCUMENTS

| CN | 106828783 | 2/2019 |
| CN | 107585263 | 4/2019 |

(Continued)

OTHER PUBLICATIONS

Norwegian Search Report for Corresponding Norwegian Patent Application No. 20210235, dated Aug. 16, 2021.
(Continued)

*Primary Examiner* — Stephen P Avila
(74) *Attorney, Agent, or Firm* — ANDRUS INTELLECTUAL PROPERTY LAW, LLP

(57) ABSTRACT

A system is for monitoring subsea parameters and is deployable in a water column. The system has: a tether to be moored to a seabed; a variable buoyancy member; one or more sensor units for sensing one or more subsea parameters; and a control unit. The control unit has a communication member for receiving data from the sensor unit(s) and for transmitting the data wirelessly to a remote recipient. The variable buoyancy member is adapted to move the communication member between a submerged position and a surface position for the wireless transmittal of data. The control unit is adapted to control the buoyancy of the variable buoyancy member. A non-variable buoyancy member is connected at an upper portion of the tether. The submerged position of the communication member is below the position of the non-variable buoyancy member. A method is for monitoring subsea parameters.

17 Claims, 20 Drawing Sheets

(56) References Cited

U.S. PATENT DOCUMENTS

| | | | |
|---|---|---|---|
| 5,655,938 A * | 8/1997 | Huguenin | A01K 61/60 |
| | | | 441/29 |
| 2016/0090160 A1 | 3/2016 | Nakagawa et al. | |
| 2019/0071962 A1 | 3/2019 | Gottlieb et al. | |
| 2021/0021913 A1 | 1/2021 | Peterson | |

FOREIGN PATENT DOCUMENTS

| | | | |
|---|---|---|---|
| GB | 2579352 | 6/2020 | |
| WO | WO-2010144625 A1 * | 12/2010 | H01Q 1/30 |
| WO | 2018057589 | 3/2018 | |

OTHER PUBLICATIONS

International Search Report and the Written Opinion for PCT/NO2022/050049, dated May 9, 2022.
Response to the Written Opinion for PCT/NO2022/050049, dated Nov. 29, 2022.
Second Written Opinion for PCT/NO2022/050049, dated Jun. 22, 2023.
International Preliminary Report on Patentability for PCT/NO2022/050049, dated Jun. 26, 2023.

* cited by examiner

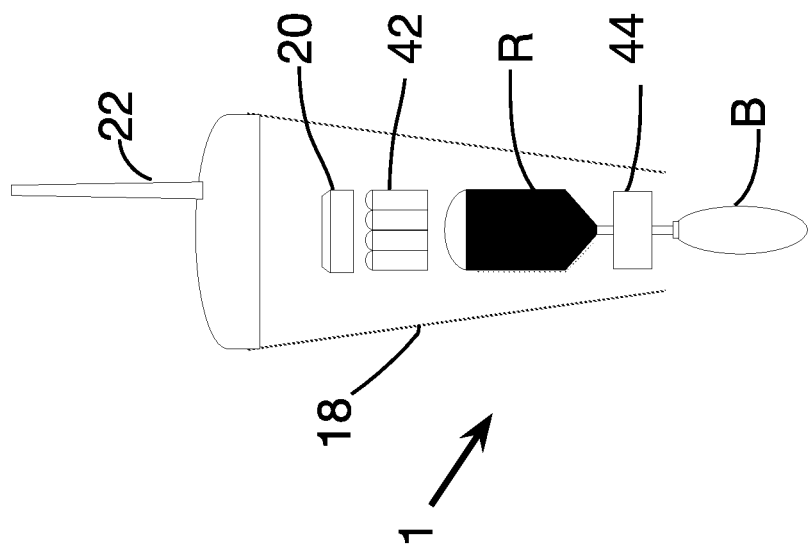
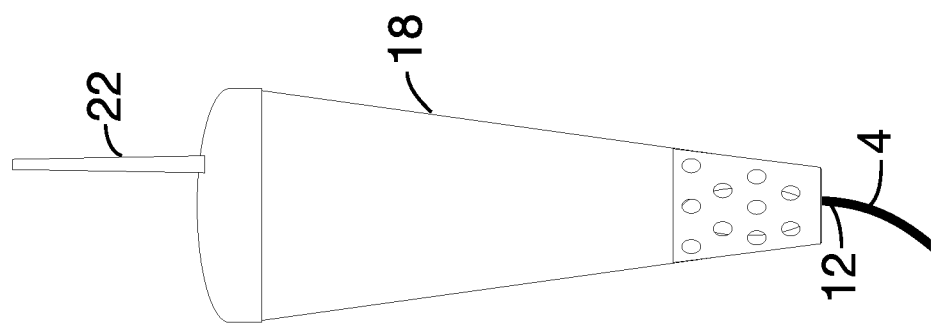
Fig. 17

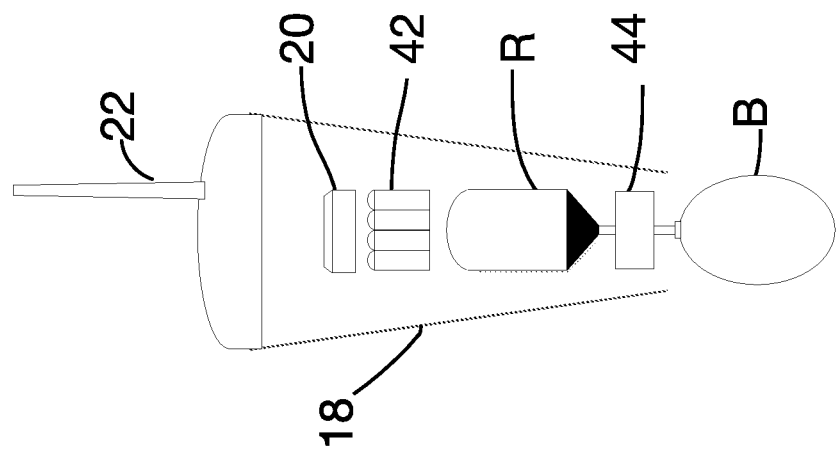
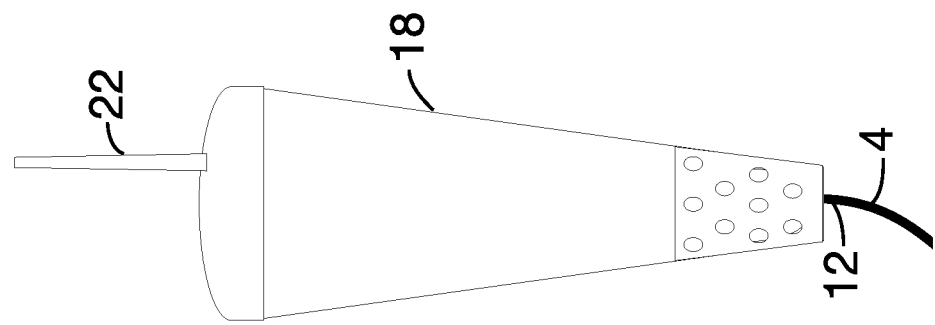
Fig. 18

SYSTEM AND METHOD FOR TRANSMITTING SUBSEA PARAMETERS

CROSS-REFERENCE TO RELATED APPLICATIONS

This application is the U.S. national stage application of International Application PCT/NO2022/050049, filed Feb. 23, 2022, which international application was published on Sep. 1, 2022, as International Publication WO 2022/182246 in the English language. The International Application claims priority of Norwegian Patent Application No. 20210235, filed Feb. 23, 2021. The international application and Norwegian application are both incorporated herein by reference, in entirety.

FIELD

The present invention relates to a system for monitoring subsea parameters. More specifically, the invention relates to a system that is deployable in a water column and comprising; a tether with a first end portion to be moored to a seabed; a sensor unit for sensing one or more subsea parameters; and a communication member for receiving data from the sensor unit and for transmitting said data wirelessly to a remote recipient, the communication member being provided at or near a second end portion of the tether. The invention also relates to a method for monitoring subsea parameters.

BACKGROUND

Communication below the ocean surface is tremendously difficult. Underwater wireless communication is severely limited in range and bandwidth, and this has forced the maritime industries to use complex and expensive solutions for remote ocean monitoring. Monitoring of temporarily abandoned subsea wells is an example of a technical area with need for better solutions. Oil and gas operators are in some jurisdictions required by law to monitor these wells for leakage, with regulations stating that they have to perform continuous monitoring. However, due to the high cost, risk and unreliability of remote ocean monitoring solutions today, these wells are instead typically inspected a minimum of two times per year by means of remotely operated vehicles deployed from large vessels. This is an expensive and logistically demanding operation, and it may not meet the regulations of continuous monitoring.

Buoys floating on the surface of the ocean and moored to the seabed are known to be used for communicating purposes. However, due to rough weather conditions the wear on such buoys may be significant. Furthermore, in the oil and gas industry, such buoys may typically not be suitable, or even allowed, to be used within the safety zones around platforms as they may disturb marine traffic and other ongoing operations and can pose significant risk in low-visibility conditions.

GB 2579352 A discloses a subsea monitoring station for monitoring one or more subsea installations, the subsea monitoring system using wireless underwater communication for transmitting and receiving interrogation or response signals.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect the invention relates to a system for monitoring subsea parameters, the system being deployable in a water column and comprising:
- a tether with a first end portion to be moored to a seabed;
- a variable buoyancy member connected to the tether at or near a second end of the tether;
- one or more sensor units for sensing one or more subsea parameters; and
- a control unit, the control unit including a communication member for receiving data from the sensor unit(s) and for transmitting said data wirelessly to a remote recipient, the variable buoyancy member being adapted to move the communication member between a submerged position and a surface position for the wireless transmittal of data, and wherein the control unit is adapted to control the buoyancy of the variable buoyancy member, wherein the tether is provided with a non-variable buoyancy member at its upper portion and the submerged position of the communication member is below the non-variable buoyancy member.

By "upper portion" is meant that the non-variable buoyancy member is connected to the tether at its upper half, preferably at its upper quarter, and even more preferably at its upper 10%, dependent on the water depth and expected currents at the location the system is to be placed in. The non-variable buoyancy member is provided with a positive buoyancy keeping the lower portion of the tether, i.e. the portion below the non-variable buoyancy member, at a substantially fixed position in the water column, independent of the variable buoyancy member. The location of the non-variable buoyancy member can be adjusted to ensure that the communication member and variable buoyancy member in idle operation mode/submerged position is at the smallest/lowest possible water depth, and thus reducing the pressure requirements of the communication member's enclosure and the variable buoyancy member, while also ensuring that the non-variable buoyancy member is located at sufficiently safe depths where most of the wave energy has dissipated (i.e. ½ wavelength submerged). For example, in the North Sea it is typical to expect big swells, for instance with waves reaching heights of 10 meters or more with wave lengths of 60 meters or more. At such locations it will be desirable to design the non-variable buoyancy member to be substantially fixed 30 meters below the ocean surface. The portion of the tether above the non-variable buoyancy member may then have a length of around 50 meters to ensure that the communication member can reach the surface when needing to transmit data. In idle operation mode the communication member and variable buoyancy member will then be positioned at a substantially fixed depth around 30-50 meters below the non-variable buoyancy member, depending on the speed of the currents at the time.

The control unit and communication member as included in the system according to the first aspect of the invention enable sensing of parameters in a water column, such as in the ocean, including at or near the surface and at or near the seabed or at any position in between. The system enables transmitting data wirelessly from the surface when needed and/or at fixed intervals, while at the same time protecting vulnerable equipment, such as the variable buoyancy member and the communication member from harsh weather conditions, marine growth and vessels on the surface by submerging to a substantially fixed position below the non-variable buoyancy member as explained herein.

By wireless communication herein is meant communication via a network where at least one link is wireless. This may be via a satellite and/or via fixed transceiver networks, including via mobile networks and satellite communication. The remote recipient may typically be a computer in a control centre at a research facility or a computer in a control centre of an operator of a petroleum well.

Varying the buoyancy of the variable buoyancy member can be done in different ways. For example, in one embodiment it may be initiated by means of a hydraulic pump adapted to move a hydraulic fluid (e.g. water or mineral based) back and forth from between an internal reservoir and an external, expandable bladder. The bladder is at least partially exposed to the water. In some embodiments, a positive displacement pump, rotary or reciprocating, may be used for this purpose. The principle is generally referred to as a "pump-driven variable buoyancy engine".

In an alternative embodiment, to vary the buoyancy, an external bladder can be expanded with gas using a pneumatic pump and/or a control valve to controllably release gas from one or more internal compressed gas cylinders to increase the buoyancy. Another control valve may be used later to release said gas from the expandable bladder to the environment to reduce the buoyancy, or a compressor may be used to move the gas from the external bladder back into the internal cylinder.

In yet another embodiment, the overall volume of the variable buoyancy member may be changed, and thereby also its buoyancy, by means of a linear actuator pushing/acting on an outer periphery/housing of the variable buoyancy member.

In effect, in the mentioned embodiments the overall, external volume of the variable buoyancy member is varied while the mass remains unchanged, thus changing its effective density and thereby controlling the buoyancy. Alternatively, a method of keeping the volume constant but changing the mass may be used to control the buoyancy, such as a ballast tank.

The variable buoyancy member, control unit, including communication member, and other power-consuming parts of the system may be powered by means of a battery pack and/or an external power source. This could for example be through an underwater turbine converting ocean currents into electricity. The turbine may be placed on the seafloor, somewhere along the tether and/or in the variable buoyancy member. In addition, or as an alternative, the variable buoyancy member, in particular when provided (at least partially) in a common housing with the communication member, may be covered by solar panels to harvest energy when the variable buoyancy member reaches the surface. By "at least partially" is meant that an external bladder of the variable buoyancy member may still be provided fully or partially external to the housing.

In one embodiment a sensor unit of the one or more sensor units may be adapted to be placed at or near a seabed. The sensor unit at or near the seabed may be included in a housing, a template or similar, and may be adapted to sense parameters at or near the seabed. In one embodiment, the housing or template may be place over or in the vicinity of a wellhead of a producing, plugged or temporarily plugged well. The sensed parameters may as such be parameters relating to the condition of a wellbore, such a pressure, temperature, or leaks of gasses or other fluids leaking form a wellbore. It should also be noted that herein, when referring to a first end of the tether being moored to or adapted to be moored to the seabed, this also includes indirect mooring, such as via a sensor unit placed on or near the seabed or via any other structure placed at and/or anchored to the seabed.

In one embodiment, in addition or as an alternative, a sensor unit of the one or more sensor units may be adapted to be placed at fixed positions along the tether. As an example, a sensor unit may be connected to a buoy of non-variable buoyancy as provided along the tether. In one embodiment the tether may comprise means for wired data transfer between the sensor unit and the communication member. This may be advantageous for efficient transfer of data from a sensor unit placed at or near the seabed or elsewhere in the water column along the tether. The means for wired data transfer may typically be one or more wires for transferring electrical and/or optical signals. In addition, or as an alternative, the tether may also be provided with wires for power transfer, which may e.g. be useful for powering the variable buoyancy member from a power source, such as battery pack, provided at or near the seabed. Wires for power transfer may also be used for charging a battery pack as also disclosed herein.

In one embodiment, the communication member and the variable buoyancy member may be provided at least partially in a common housing. By "partially" is meant that in some embodiments, as discussed above, an expandable bladder portion of the variable buoyancy member may be arranged fully or partially external to the housing, i.e. in direct contact with water. This may simplify the design of the system and ensure that the communication member is always brought efficiently and reliably up to the surface for wireless transmission. In one embodiment, the whole control unit, including the communication member, may be placed in a common housing with the variable buoyancy member, though with the option of an external bladder. In other embodiments the control unit, or at least parts thereof, may be placed elsewhere in the system, such as in combination with a sensor unit at the seabed or anywhere along the tether.

As an alternative or addition to a sensor unit at or near the seabed, a sensor unit of the one or more sensor units may be adapted to move along the tether by means of change of buoyancy of the sensor unit or housing in which the sensor unit is enclosed. Similarly to what was disclosed above, the housing that is adapted to climb up and down along the tether is provided with its own variable buoyancy engine working according to the same principles. The variable buoyancy engine in the housing may be controlled by its own designated control unit, or it may be activated by signals from an external control unit, such as when reaching a data transfer station at the seabed/mooring or from a common housing of the communication member, control unit and variable buoyancy member at the second portion of the tether. The sensor unit moving up and down along the tether by means of buoyancy is connected to the tether so that is kept in position normal to the length of the tether by the tether. Preferably this may be enabled by forming this sensor unit/housing with a hole therein such that the sensor unit/housing may encircle the tether. This sensor unit, climbing along the tether, may be used for collecting data from the water column at any position along the tether, which could be a very useful functionality for ocean research and environmental monitoring purposes. Connecting the sensor unit to the tether in this manner may reduce energy consumption and provide a simple and efficient way of collecting data at any position along the tether. The sensor unit may also be adapted to remain at a substantially fixed position relative to the tether over time and thereby collect data at the fixed position over time. The sensor unit may be adapted to dock for charging and/or transfer of data at a docking station provided in combination with a sensor unit at or near the seabed and/or at a docking station provided in combination with the communication member and/or variable bouncy member. The sensor unit adapted to climb along the tether may be provided as an addition or alternative to wired data transfer through/along the tether. It should also be noted that the buoyancy of the sensor unit according to this embodiment may contribute to bringing the communication member to its surface position, and that it in one specific embodiment may also function as the variable buoyancy member as included in the first aspect of the invention. In such an embodiment, an upper portion of the tether may be provided with a stiff telescoping rod that ensures that when the sensor unit's buoyancy is decreased, it descends in a controlled manner on the tether/rod and does not end up being trapped, as will become clear with reference to the drawings and their detailed description.

In one embodiment, as an alternative or addition, a sensor unit of the one or more sensor units may be connected to or integrated in the common housing including the variable buoyancy member and the communication member. This may be particularly useful if parameters are to be sensed in the upper portion of the water column, in which the communication member and variable buoyancy member operates. This sensor unit, included in a common housing with or mechanically connected to the variable buoyancy member, may e.g. be used to sense currents and/or wave heights, as will be explained in further detail below, and thereby be used as input to the control unit for when it is "safe" for the variable buoyancy member to increase its buoyancy and bring the communication member to surface.

In one embodiment the system, in an idle/submerged operation mode, may be adapted to keep the communication member at a substantially fixed position below non-variable buoyancy member. This may be useful to reduce the energy consumption of the system as such and to keep the communication member and variable buoyancy member at a safe position below the surface when not in use, thus avoiding the strongest effects of waves and wind, and not posing any danger to traffic on the surface. Furthermore, the non-variable buoyancy member makes the variable buoyancy member more effective in bringing the communication member to the surface as it in practical terms shortens the vertical distance it needs to move and the length of the tether it needs to "lift". This is beneficial as it does not restrict the system to only be able to bring the communication member to the surface in very calm water conditions and when the currents are weak, but can instead surface to transmit data when needed and only be restricted by severe weather conditions. The variable buoyancy member itself may be negatively or positively buoyant in the idle operation mode, depending on the buoyancy of the upper portion of the tether, i.e. the portion above the non-variable buoyancy member. If the tether is positively buoyant, the variable buoyancy member may need to be negatively buoyant to compensate and thus keep the communication member, and the total system as such, at a substantially fixed position. Oppositely, if the tether has a negative buoyancy, then the variable buoyancy member may be positively buoyant to compensate. It should be noted that the variable-buoyancy member will typically have a slightly net negative buoyancy in idle operation mode and a substantially greater net positive buoyancy when transmitting data at the surface, though the embodiment is not limited to this configuration. It should also be mentioned that by "idle operation mode" in this context is meant that the communication member is not actively transmitting and is at a substantially fixed, submerged position below the position of the non-variable buoyancy member or sinking to reach this position. Sensing and collecting data may of course still be operational. The inclusion of the non-variable buoyancy member(s) is beneficial to increase buoyancy of the tether and the system as a whole, and/or to create a buckling on the tether near the upper portion of the tether so that the variable buoyancy member only needs to "lift" an upper portion of the tether, above the non-variable buoyancy member, to raise the communication member to the surface. In one exemplary embodiment, if the system is deployed and moored to seabed located 300 meters below the water surface, the variable buoyancy member will only need to overcome the vertical component of the current drag from the upper e.g. 30 meters of the water column, as opposed to "lifting" the whole tether, which will exceed 300 meters in length and will be subject to substantial drag from the ocean currents. This may be useful to reduce the energy consumption of the system as such and reduce the need for a very large change in buoyancy from the variable-buoyancy member in order to overcome the vertical component of the drag on the tether, and therefore ensure a more compact design of the variable-buoyancy member. In one embodiment, when the system is adapted to keep the communication member at a substantially fixed, submerged position below the non-variable buoyancy member, an upper portion of the tether, above a non-variable buoyancy member, to which the variable buoyancy member is connected may be "hanging" downwardly in the idle operation mode. The variable buoyancy member/housing in which it is provided may then have a negative buoyancy counteracted by the non-variable buoyancy member on the tether, whereby the communication member is kept at a substantially fixed vertical position below the surface. This may be beneficial to reduce the complexity of the control unit and the variable-buoyancy member, as it allows the system to operate in a binary manner where the variable-buoyancy member either increases the buoyancy to have the communication member float up to reach the surface, or it decreases the buoyancy so that the communication member sinks to the submerged position and held in place by the one or more additional buoyancy members. Using a pump-driven variable buoyancy engine as an example, this may enable a less complex system where the variable buoyancy member may "simply" be controlled to either completely fill or completely empty the internal fluid reservoir in order to move to one of its two extreme positions; the water surface or a submerged position below the non-variable buoyancy member. This may be beneficial as it does not require input from sensors or highly accurate buoyancy engine in order to achieve its desired depths. All in all, introducing a non-variable buoyancy member to create a buckling on the tether improves the system as a whole and provides benefits in the form of reduced complexity, size and cost compared to alternative solutions. The system may also include additional buoyancy members along its length between the non-variable buoyancy member at the upper portion and the first end of the tether at the seabed so as to further increase the buoyancy of the tether. These additional buoyancy members may also have a non-variable buoyancy, but in alternative embodiments, one or more of these additional buoyancy members may have a variable buoyancy as disclosed herein.

In practical use, the system will be deployed in the water column with the first end of the tether moored, directly or indirectly, to the seabed. By "directly" is meant that the first end of the tether is connected to an anchor which is installed on or below the seabed. By "indirectly", as mentioned above, is meant that the tether is connected to another component, such as a module including a sensor unit, a template or similar, that has its own anchoring.

In practical use the sensor unit of the one or more sensor units is placed on or near a seabed and/or at a fixed position along the tether and/or movably arranged along the tether by means of change of buoyancy of the sensor unit and/or is connected to or integrated in the variable buoyancy member. As will be understood, the system may include one or more of the mentioned sensor units. In some embodiment, one or more sensor units may be adapted to sense parameters in relation to a well used in the exploration or production of oil and gas. One or more sensors in one or more sensor units may be active acoustic sensors, such as sonar detectors for detecting fluids of different density which have different acoustic impedance. Such sensors may be adapted to give an indication of area coverage and the position of a potential oil or gas leak. One or more sensors may in addition, or as an alternative be passive acoustic sensors such as hydrophones. Such passive acoustic sensors are adapted to sense pressure/sound waves and two or more such sensors working together may be used to localise a leakage. In addition or as an alternative one or more sensors may be capacitance sensors adapted to measure dielectric constant of a medium surrounding the sensor, such as to distinguish between seawater and hydrocarbons. In addition or as an alternative, one or more sensors may optical sensors, such as a camera, which can be used as a sensor of its own and/or as redundancy verification to avoid false positives from other sensors. In other embodiments, one or more sensors of the one or more sensor units may be used for environmental monitoring, which may be particularly relevant for a sensor unit climbing up and down along the tether as explained herein. One or more sensors may be provided as CTD (Conductivity, Temperature and Depth) sensors for measuring salinity, pressure and temperature and/or Acoustic Doppler Current Profiler (ADCP) or similar sensors for measuring waves and current profiles, including in real-time, and directional waves and/or biogeochemical sensors for measuring chemical concentrations, such as oxygen, nitrate, chlorophyll, pH level etc. In one embodiment the control unit may adapted to control the buoyancy of the variable buoyancy member in response to one or more of the following parameters:
time;
weather conditions;
subsea parameters sensed by means of the one or more sensor units; and
a signal generated externally from the system.

The control unit may be programmed to increase the buoyancy of the variable buoyancy member to bring the communication member to a surface position at regular intervals, such as once or twice a year, quarterly, monthly, weekly, daily etc. After data has been transmitted wirelessly to the remote recipient, the control unit will initiate reduction of the buoyancy of the variable buoyancy member to bring it down to a submerged position. In addition, or as an alternative, the control unit may be adapted to receive information about weather conditions to ensure that it is "safe" to bring the communication member to surface. Information about the weather conditions may be obtained by using a sensor for measuring the ocean current or waves, for instance by having an echosounder pointed upwards to measure the wave height on the surface. In one embodiment, when a built-in timer in the control units tells the control unit that it is time to increase the buoyancy of the variable buoyancy member, it may then first check the weather conditions/ocean currents/wave heights to verify that it is safe to climb to surface. In other embodiments, as additions or alternatives, the system may be provided with gyroscopes and/or accelerometers to indirectly measure the impact of the water on the variable buoyancy member. In another embodiment, as an alternative or addition, the control unit may also be adapted to receive information of predictive weather data/forecasts each time the communication member is on the surface, so that transmission of data is two-directional. As an addition or alternative, the control unit may also be programmed to increase the buoyancy of the variable buoyancy member when a sensed parameter reaches a predetermined threshold. Examples of this may be when a sensor unit of the one or more sensor units monitors pressure and/or temperature at or below a wellhead and/or when an acoustic or optical sensor is collecting data on leaks from the wellhead, template or pipe such as by sensing a density of gas bubbles immediately above the wellhead, template or pipe. In yet another embodiment, the control unit may be adapted to increase buoyancy of the variable buoyancy member on receiving an external signal, such as wirelessly via an underwater acoustic pinger or another external facility and/or wired data communication from an external facility. The external facility may in one embodiment be a surface vessel or an autonomous underwater vehicle.

In a second aspect, the invention relates to a method for monitoring subsea parameters in a water column by means of a system according to the first aspect of the invention, the method comprising the steps of:
mooring the first end of the tether to the seabed;
sensing one or more subsea parameters with the sensor unit;
receiving the data from the sensor unit(s) with the communication member;
regulating the buoyancy of the variable buoyancy member by means of the control unit so as to bring the communication member to a surface position in the water column; and
transmitting the data wirelessly to the remote recipient.

Similarly to what was explained above, "mooring the first end of the tether to the seabed", also includes indirect mooring.

In one embodiment, after having transmitted data wirelessly to a remote recipient, the method may further comprise the step of:
reducing the buoyancy of the variable buoyancy member so as to bring the communication member to a substantially fixed position below the non-variable buoyancy member in the water column.

In yet another embodiment the step of regulating the buoyancy of the variable buoyancy member may be done in response to one or more of the following parameters:
time;
weather conditions;
subsea parameters sensed by means of the one or more sensor units; and
a signal generated externally from the system.

There is also disclosed herein a system similar to the system according to the first aspect of the invention but where the system does not necessarily include one or more sensor units and/or a communication member. Such as system may, instead of or in addition to transmitting sensor data from the water column as the system according to the first aspect of the invention, be used to provide power to components provided in the water column, such as for charging batteries provided in a module at or near the seabed through the tether. Alternatively or in addition, the system may also be used to transmit fluids for use in a well or in subsea equipment through the tether. In one embodiment, such fluids may be hydraulics for replenishment of a subsea hydraulic power unit, liquids used in the treatment and/or stimulation of a well or subsea equipment etc. through the tether. The variable buoyancy member will in such an embodiment be adapted to bring the connection for such transfer of fluids and/or power to surface position in response to parameters mentioned above.

Similarly there is also disclosed methods for transferring power and/or fluids from a surface position to a position in the water column by means of such a currently not claimed system.

In sum, embodiments disclosed herein, claimed and unclaimed, may be regarded as systems and methods for physically connecting a device located subsea with the ocean surface by means of changing the buoyancy of a variable buoyancy member to bring a free end of a tether to a position at or near the surface.

BRIEF DESCRIPTION OF THE DRAWINGS

In the following is described examples of preferred embodiments illustrated in the accompanying drawings, wherein:

FIGS. 17-18 show a variable buoyancy member, both in side view and cross-section, in different operational modes;

DETAILED DESCRIPTION OF THE DRAWINGS

Figure 1:
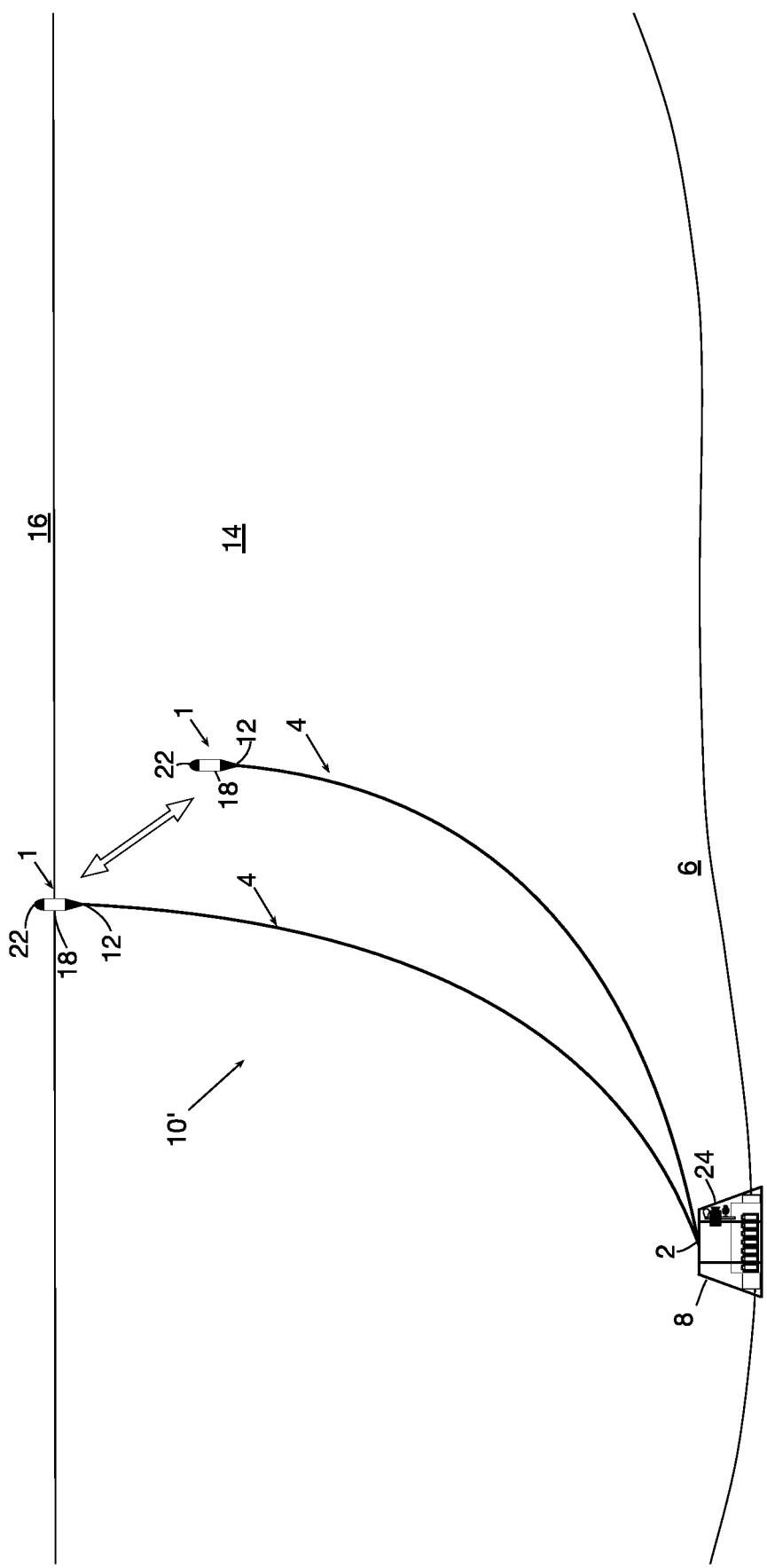
FIG. 1 shows a system according to a first comparative example.

In the following, the reference numeral 10 will be used to denote a system according to the invention, whereas the reference numeral 1 will be used to denote a variable buoyancy member as used in such a system. The drawings are shown highly schematic and simplified and various features therein are not necessarily drawn to scale. Identical reference numerals refer to identical or similar features in the drawings.

FIG. 1 shows a system 10' according to a first comparative example. A first end 2 of a tether 4 is moored to the seabed 6 via subsea template 8. At a second end 12 of the tether is provided a variable buoyancy member 1. The system is shown in two positions of use in a water column 14; a first position to the right where the variable buoyancy member 1 is in a position below a surface 16 of the water column 14 and a second position to the left, where variable buoyancy member 1 has moved to a position at the surface 16. In the shown embodiment, and as will exemplified in FIGS. 17-18 and discussed below, the variable buoyancy member 1 is provided partially within a housing 18 in which also a control unit 20 comprising a communication member 22 is provided. At the surface location 16 the communication member is adapted to send data wirelessly to a not shown remote recipient. The movement of the variable buoyancy member 1 and tether 4 between the two positions of use is indicated with an arrow in the drawing. In the shown embodiment an exemplary sensor unit 24, here in the form of an optical sensor/camera together with an acoustic sensor, is shown. Sensed data from the optical sensor is sent via a not shown data wire in the tether 4. Alternatively, the data wire may run in parallel with the tether 4. The template 8 may be placed above or in the vicinity of a not shown wellhead. In the shown embodiment, the system 10 mimics the appearance of seagrass freely moving in the water due to the exposure to oceans streams, wind and waves. This comparative example illustrates the significant vertical drag from the tether the variable buoyancy member must overcome in order to bring the communication member to the water surface, and as such would require the variable buoyancy member to have capabilities to make a very large change in buoyancy in order to control its position in the water column. Furthermore, without a positively buoyant tether, making the variable buoyancy member negatively buoyant will cause the communication member to continue sinking until it crashes into the seabed.

Figure 2:
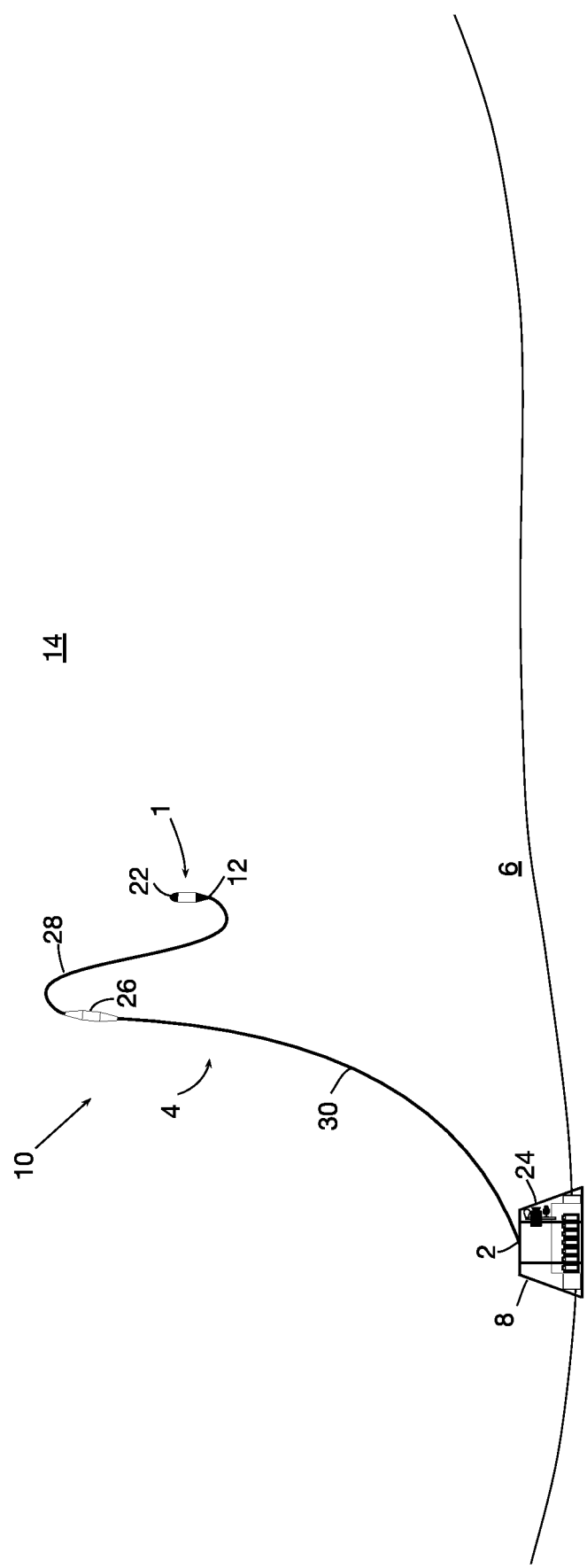
FIGS. 2-4 show a first embodiment of a system according to the invention.
Figure 3:
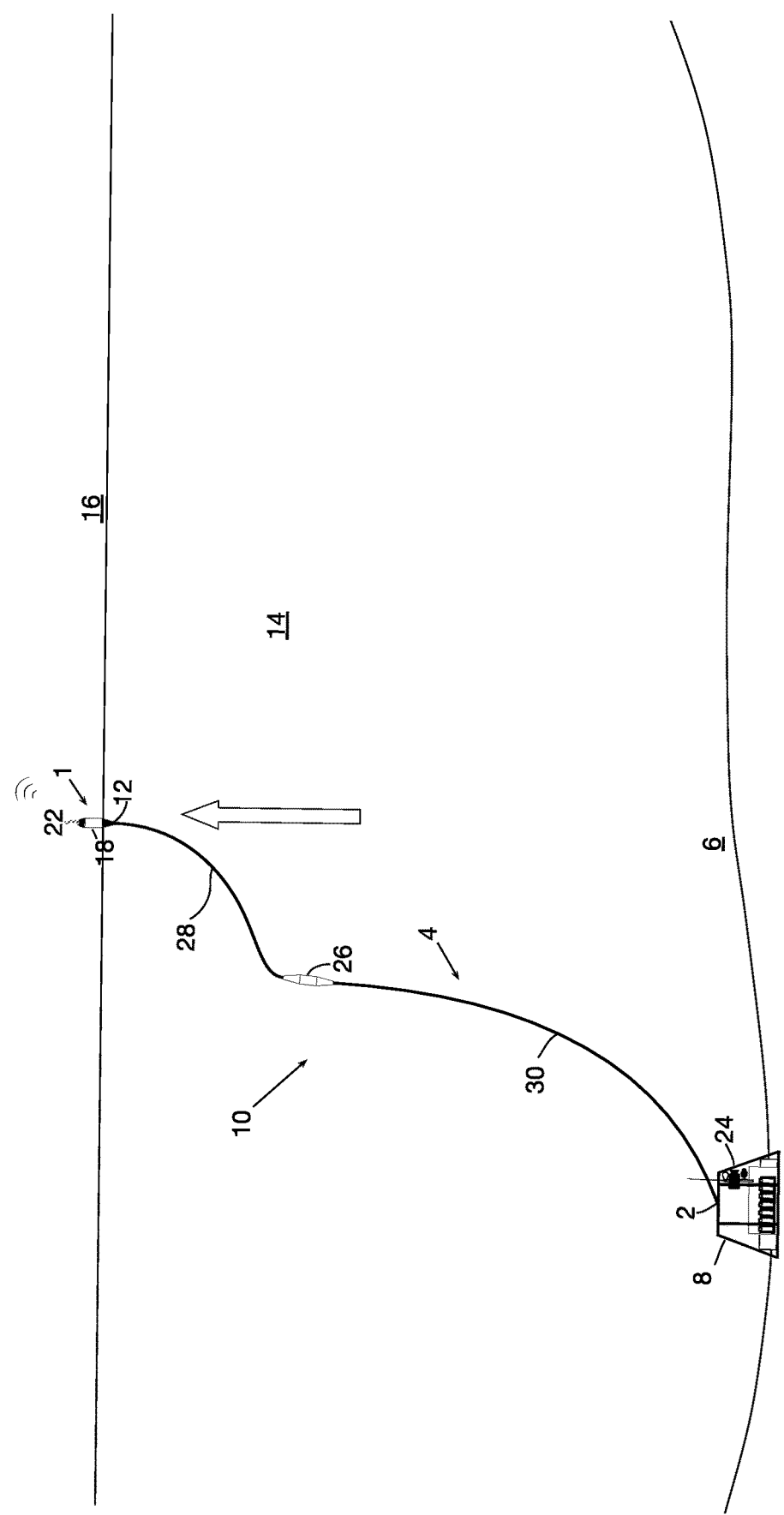
Figure 4:
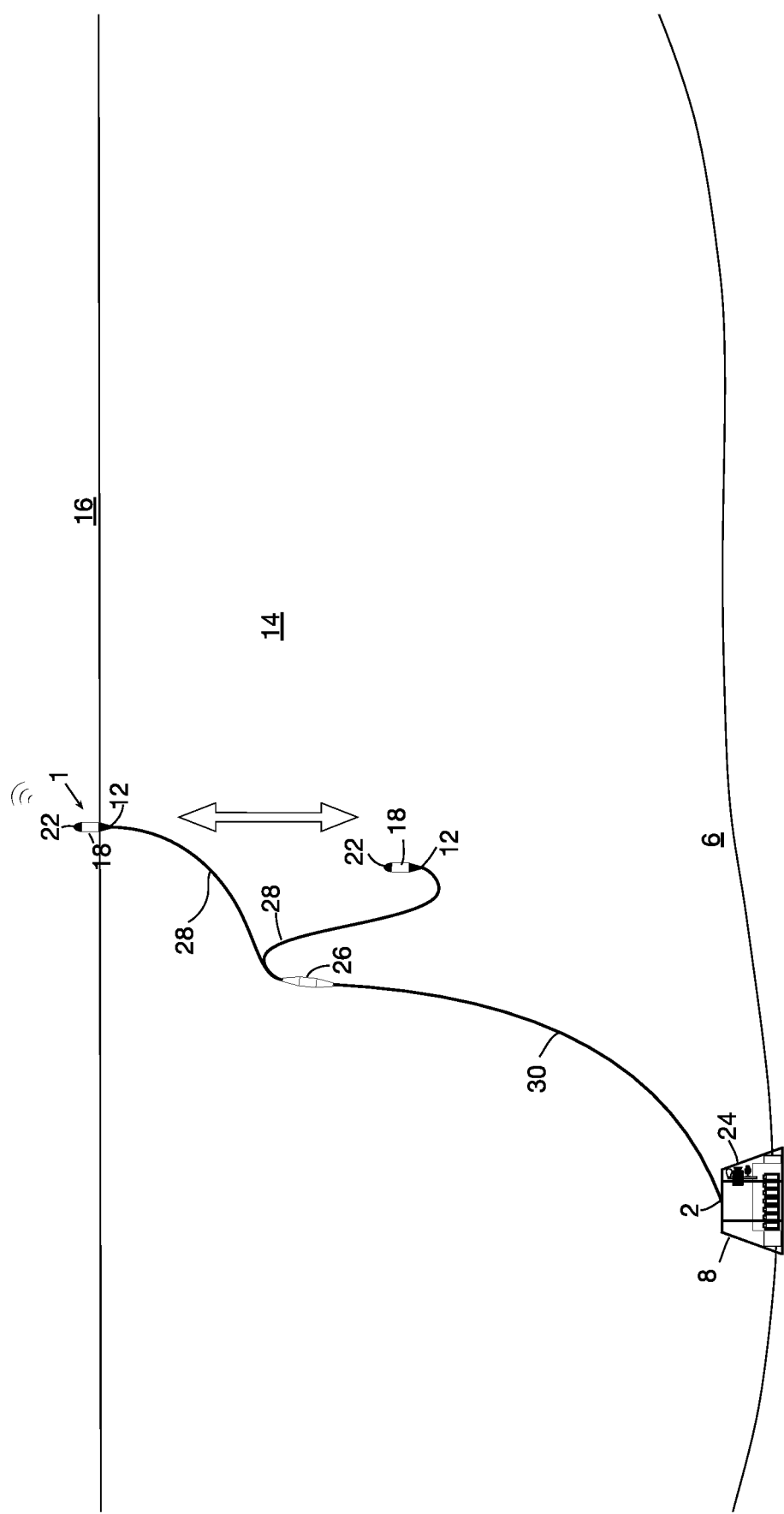

A first embodiment of a system 10 according to the invention is shown in FIGS. 2-4. The embodiment is quite similar to the one in FIG. 1 in terms of functionality, but as can be seen in the figures the tether 4 additionally provided with a non-variable buoyancy member 26 near its upper portion. In an idle position, as shown in FIG. 2, the variable buoyancy member 1 "hangs" downwardly together with an upper portion 28 of the tether 4, below the buoyancy member 26. When it is time to move the variable buoyancy member 1, including the communication member 22, to a surface position 16, only the weight of the upper portion 28 of the tether 4, above the buoyancy member, needs to be lifted in order to bring the communication 22 member to the surface position 16, as indicated in FIG. 3. An arrow in FIG. 4 indicates the movement between the two positions; surface and submerged, where only the upper portion 28 of the tether 4 is affected by the change in buoyancy of the variable buoyancy member 1, while a main/lower portion 30 of the tether 4, below the buoyancy member 26, remains substantially unaffected.

Figure 5:
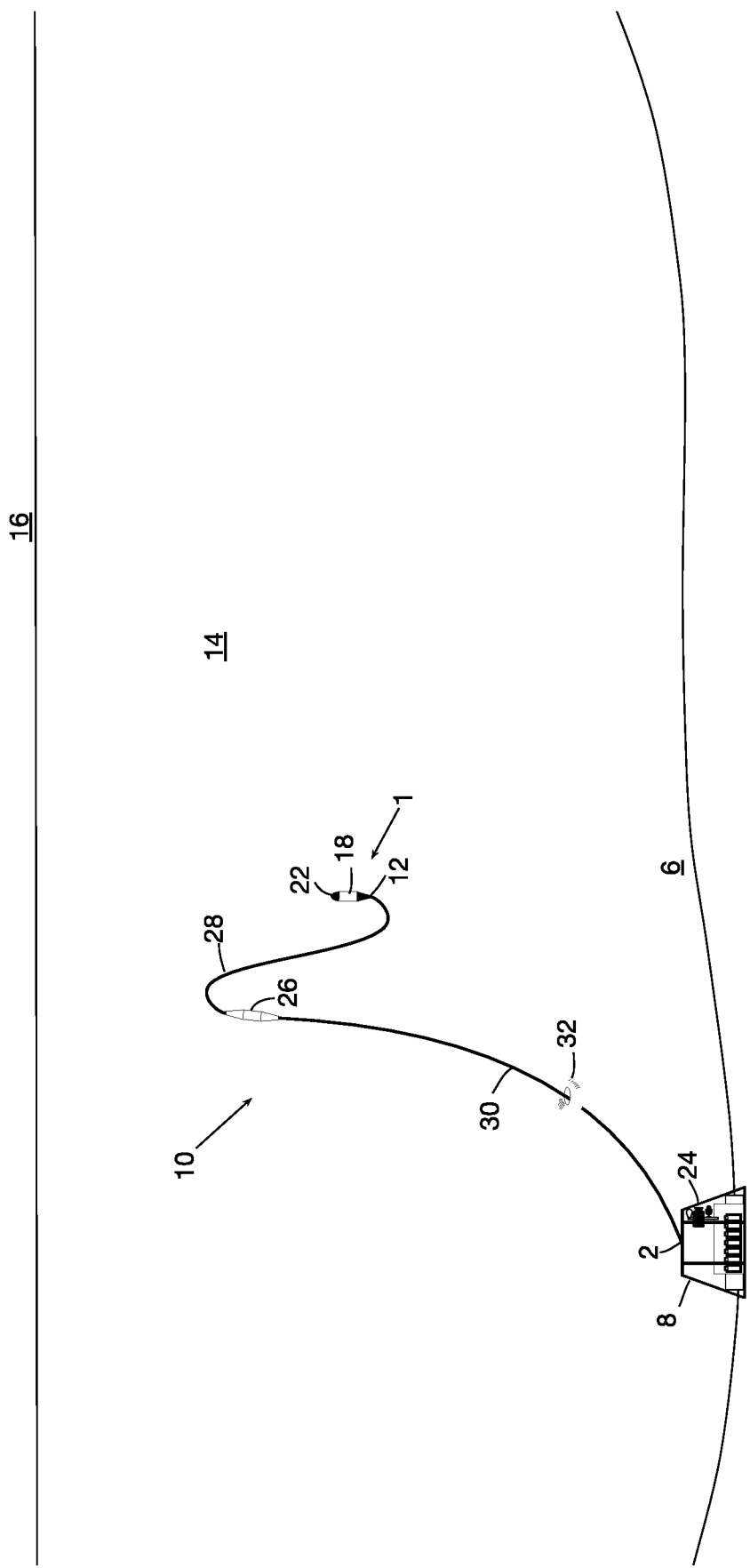
FIGS. 5-6 show a second embodiment of a system according to the invention.
Figure 6:
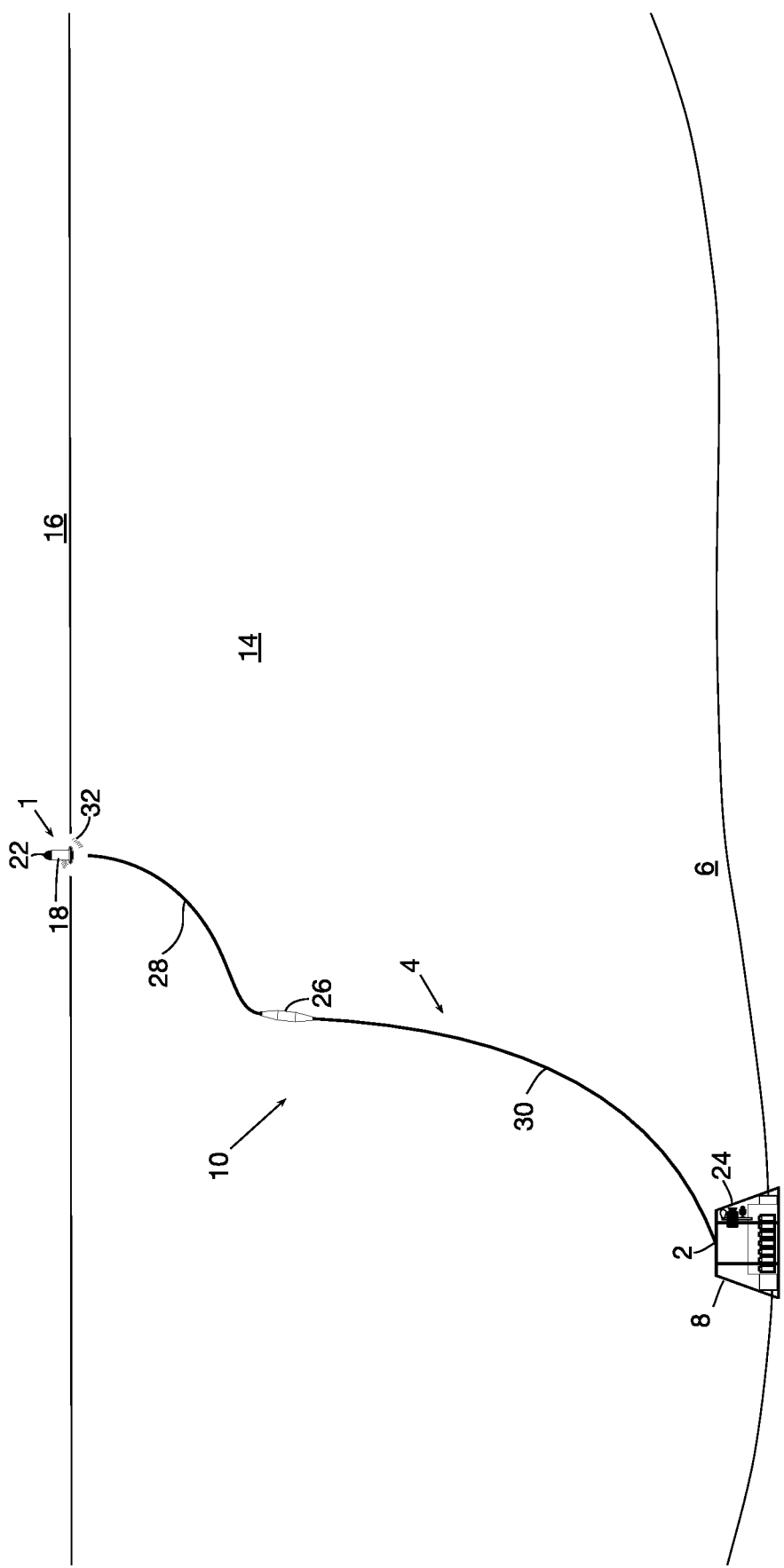

FIGS. 5 and 6 show a second embodiment of a system 10 according to the invention. The system 10 is quite similar to the one shown in FIGS. 2-4, but where an additional sensor unit, here in the form of doughnut-shaped drone 32 is encircling the tether 4. The doughnut-shaped drone 32 will hereinafter referred to as an "O drone". The O drone 32 is adapted to change its buoyancy to climb up and down along the tether 4, so as to sense subsea parameters at any position between the first and second ends 2, 12 of the tether 4. In this embodiment, the buoyancy member 26 will have a design that allows the sensor unit 32 to pass it. Change of buoyancy may be done by means of a built-in hydraulic pump and/or by shifting compressed gas from a cylinder to an expandable bladder as explained above. In the shown embodiment the O drone 32 is provided in addition to the sensor unit in the subsea template 8. The O drone 32 may be adapted to dock for charging and/or transfer data from its sensor unit in contact with the subsea template 8, at the variable buoyancy member 1 and/or at any position along the tether 4, such as at the buoyancy member 26. Transfer of power/and or data to/from the O drone 32 may be done inductively. In the shown embodiment, the variable buoyancy member 1 and the not shown variable buoyancy engine of the O drone 32 are "acting together" in the sense that both variable buoyancy entities are controlled to a positive buoyancy to bring the O drone 32 to a surface position. As disclosed herein the O drone 32 may transfer data to the control unit 20 in the housing 18 of the variable buoyancy member 1 when the two units are docked together, and the data may be transmitted wirelessly from the communication member to the not shown remote recipient. The O drone 32 and housing 18 may also be brought to the surface position for maintenance.

Figure 7:
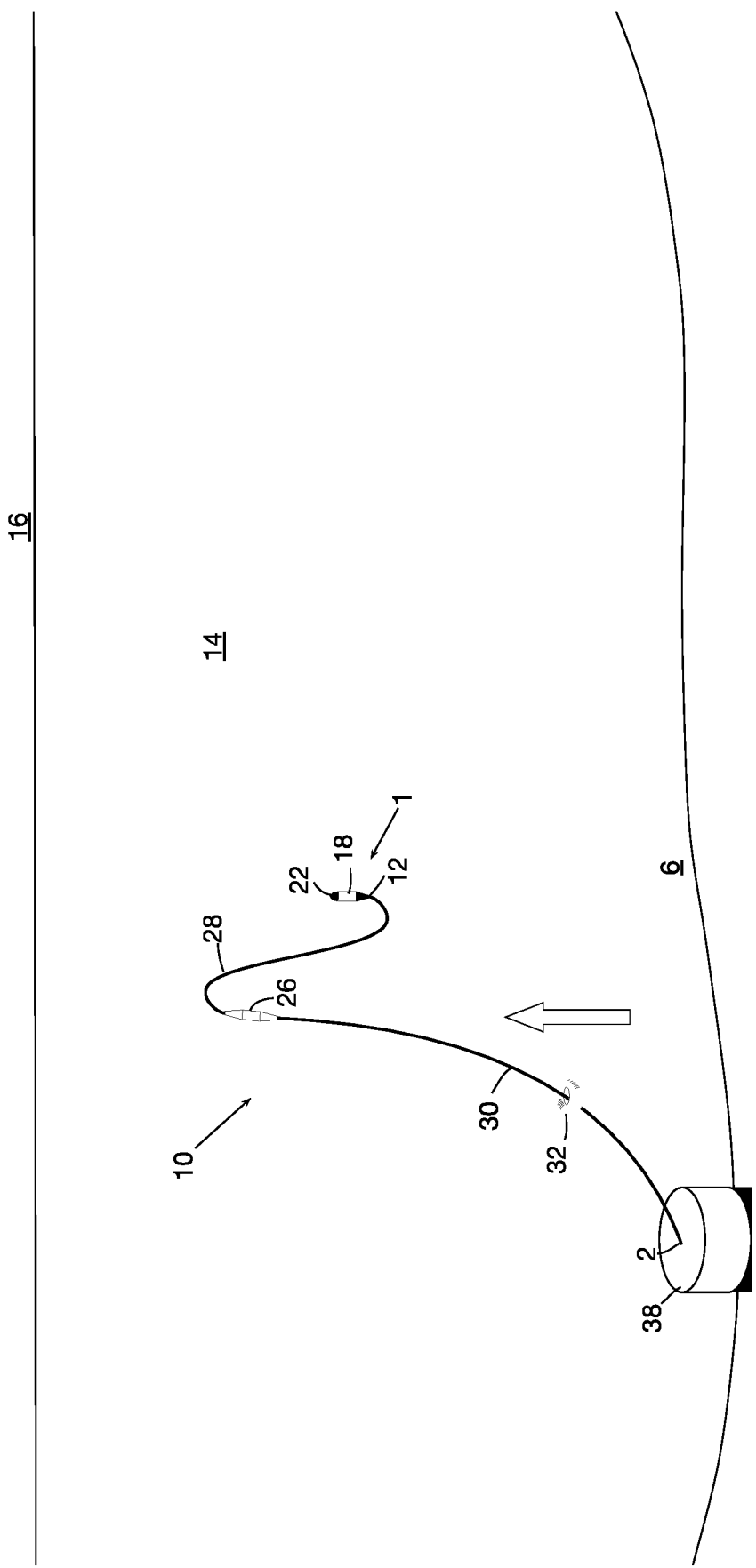
FIG. 7 shows a third embodiment of a system according to the invention.
Figure 8:
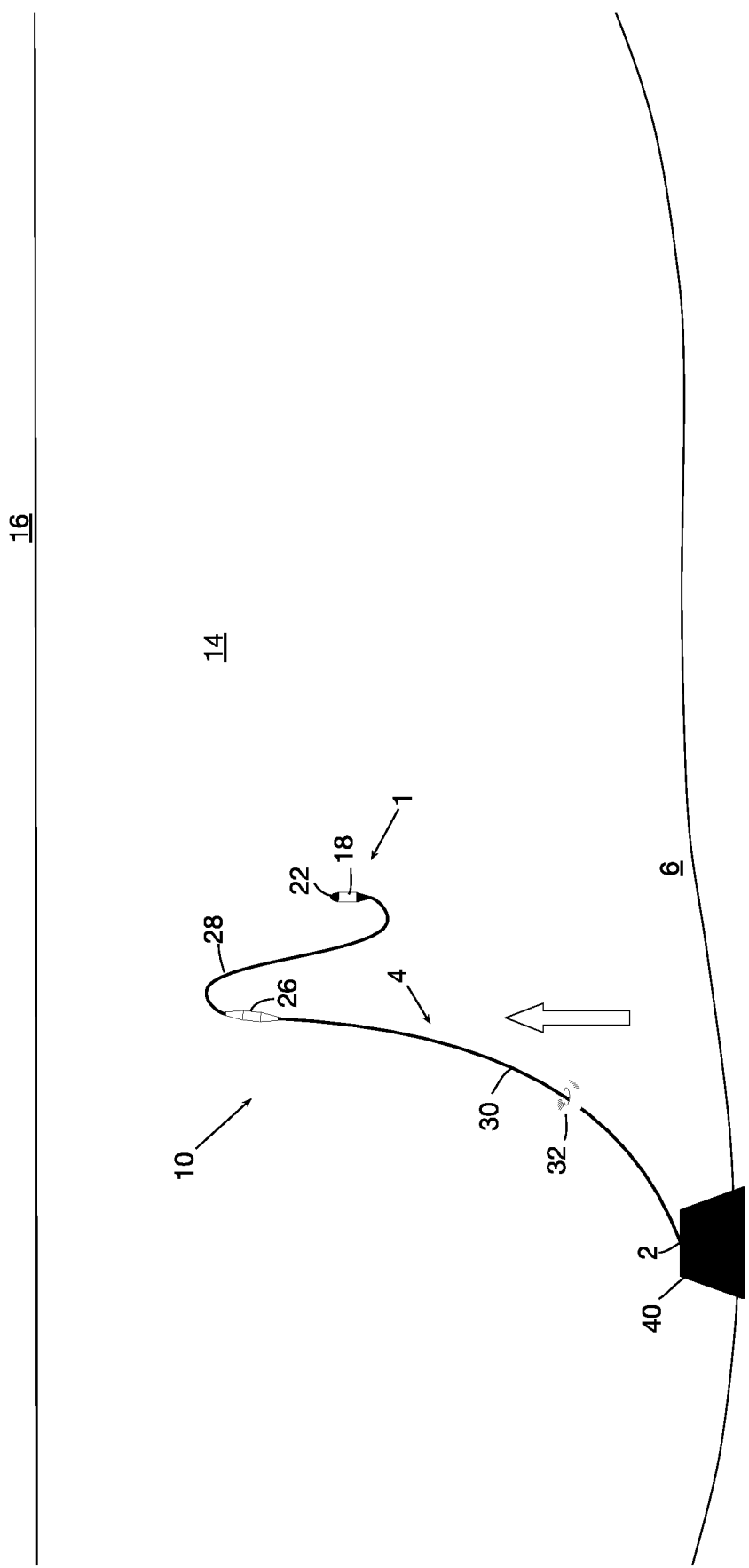
FIGS. 8-9 show a fourth embodiment of a system according to the invention.
Figure 9:
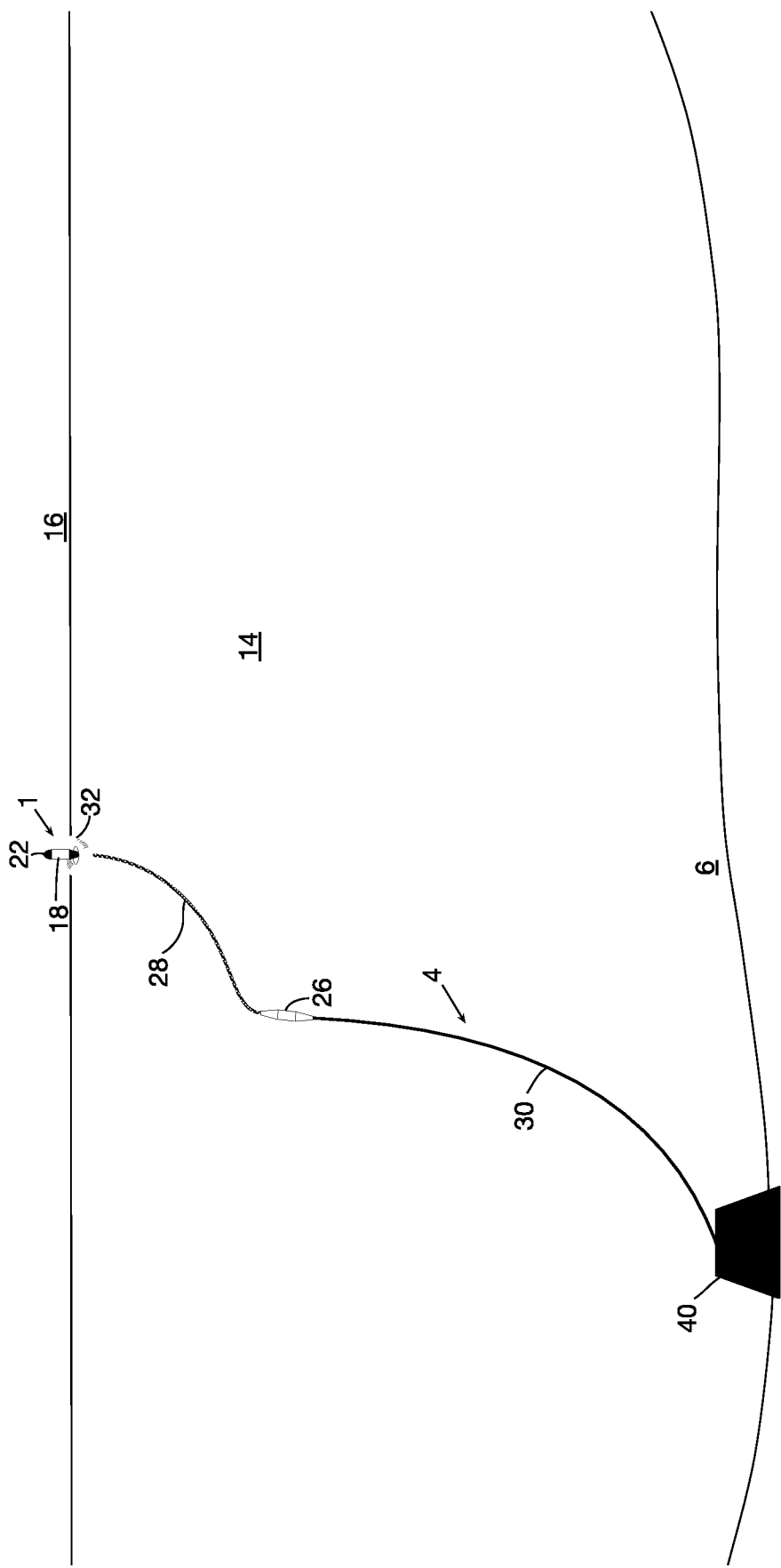

FIGS. 7, 8 and 9 show an embodiment where the O drone 32 is the only sensor unit in the system 1, as the first end 2 of the tether 4 is moored by means of a suction anchor 38 in FIG. 7 and with a concrete block 40 in FIGS. 8 and 9 having as its only function to moor the tether 4. The O drone 32 is adapted to transfer data to, and optionally being charged by, the housing 18, including control unit 20 and battery pack, as shown in FIGS. 17-18. The upwards pointing arrows in FIGS. 7 and 8 indicate that the O drone 32 is climbing. Similar to the embodiment shown in FIGS. 5 and 6, the O drone 32 and variable buoyancy member 1 may be "acting together"

It should be noted that in the embodiments of FIGS. 7-9, the tether 4 does not need to include a wire for data transfer since no subsea parameters are sensed in the mooring at the seabed, and since the O drone 32 is adapted to dock at the buoyancy member 1/housing 18 at the surface 16.

Figure 10:
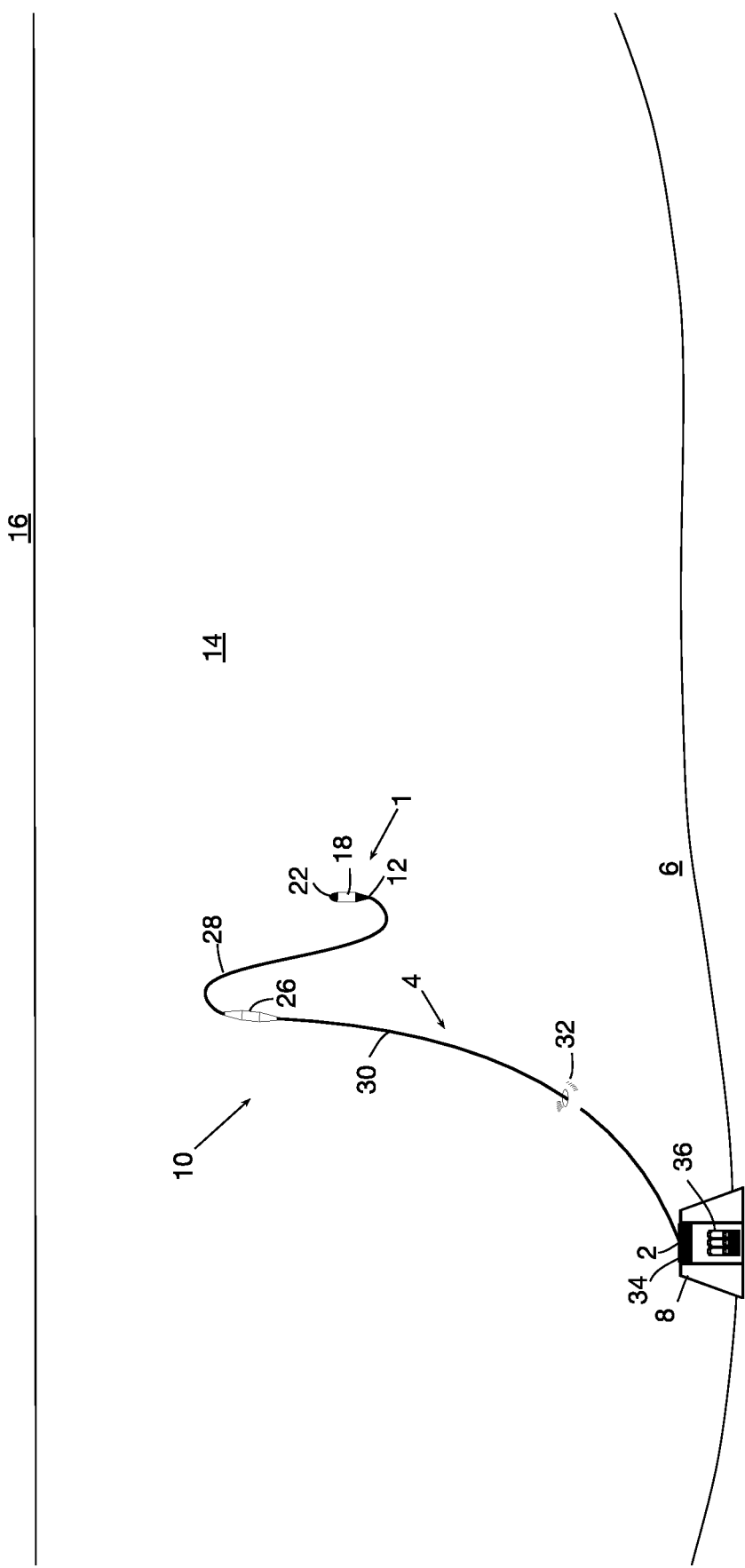
FIGS. 10-11 show a fifth embodiment of a system according to the invention.
Figure 11:
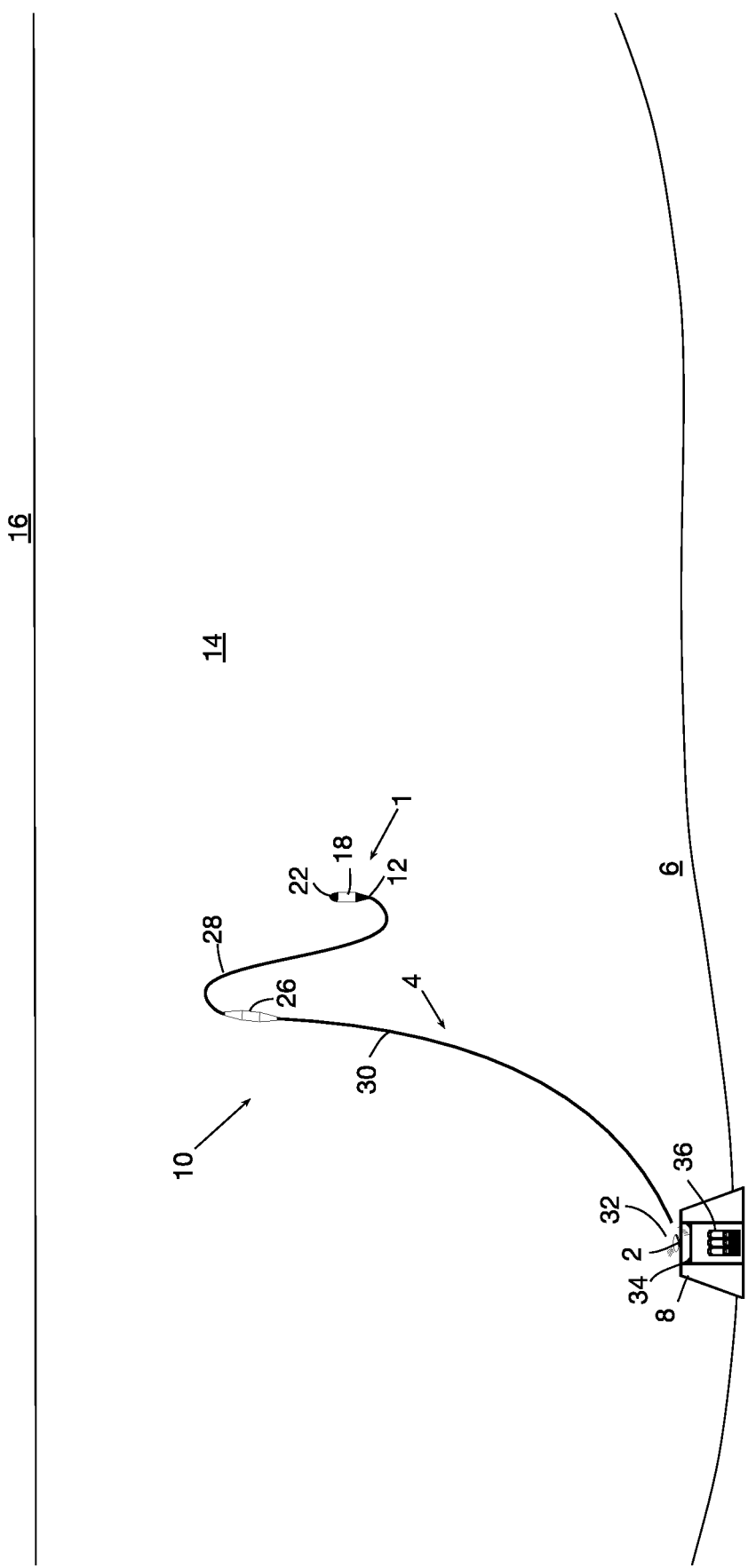

FIGS. 10 and 11 show an embodiment where the subsea template 8 is provided with a docking station 34 for the O drone 32 and a battery bank 36 for supply of power to the O drone 32. In this embodiment, data transfer may or may not take place at the docking. If data transfer takes place at the docking, the tether 4 will include a wire for data transfer as discussed above.

Figure 12:
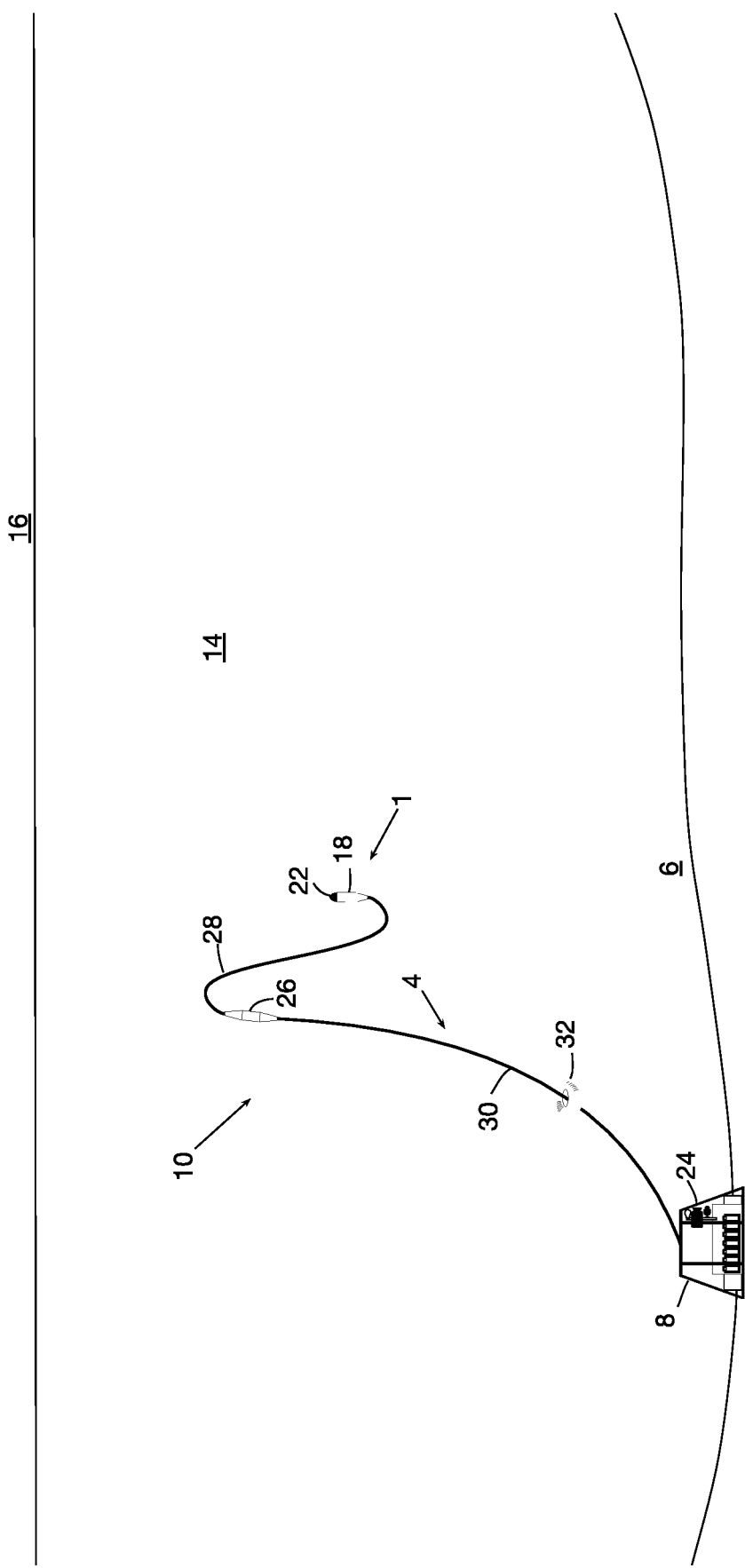
FIGS. 12-14 show a sixth embodiment of a system according to the invention.
Figure 13:
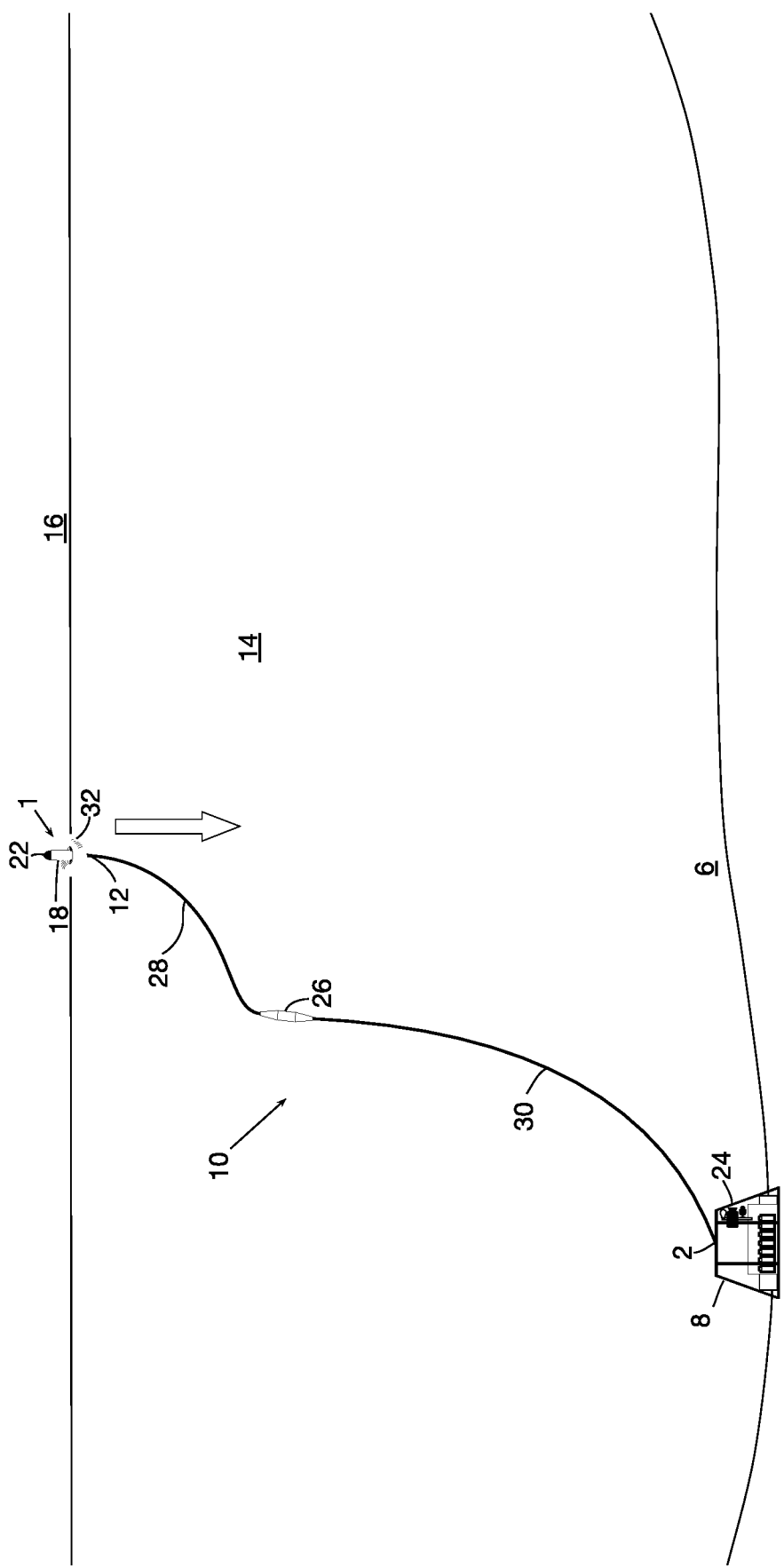
Figure 14:
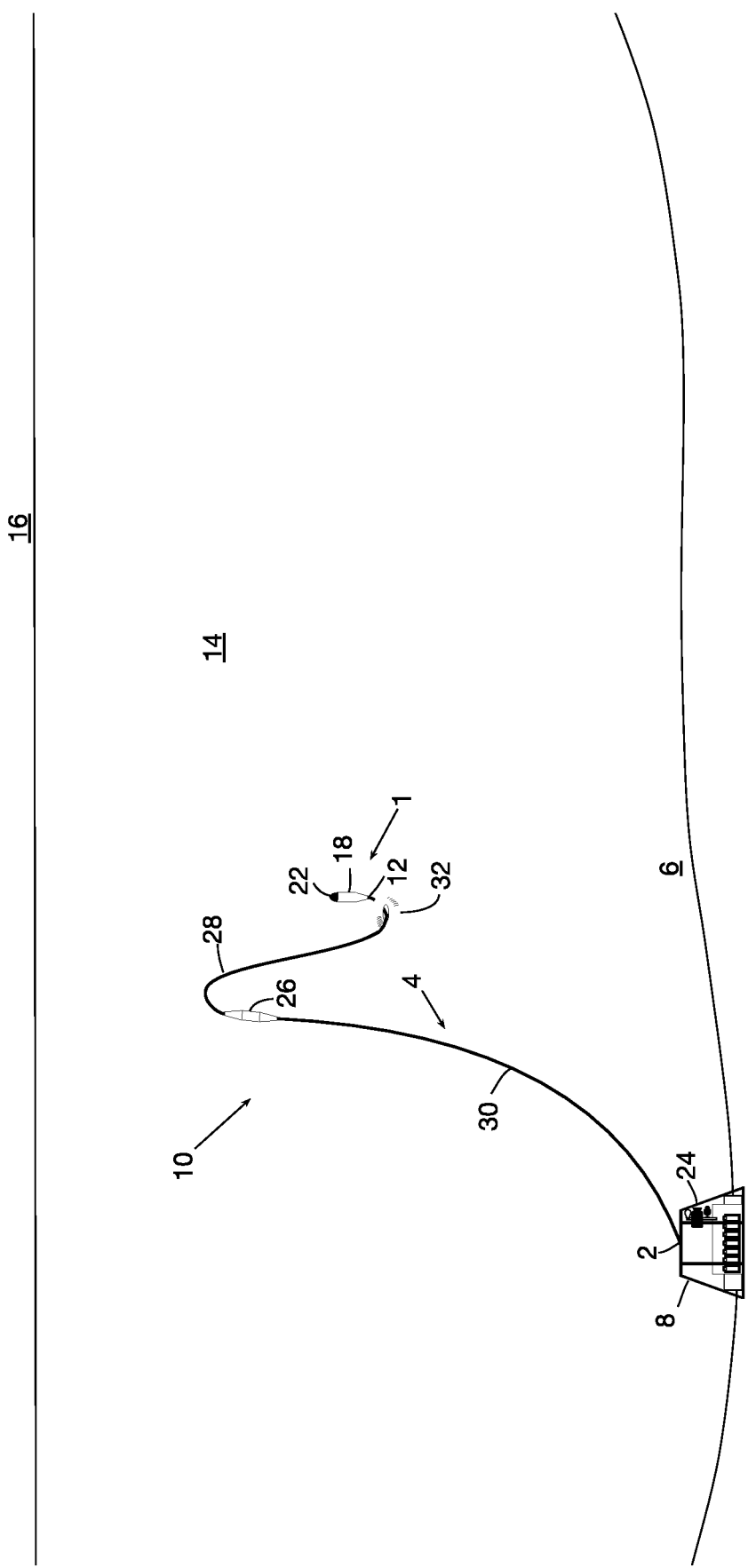
Figure 19:
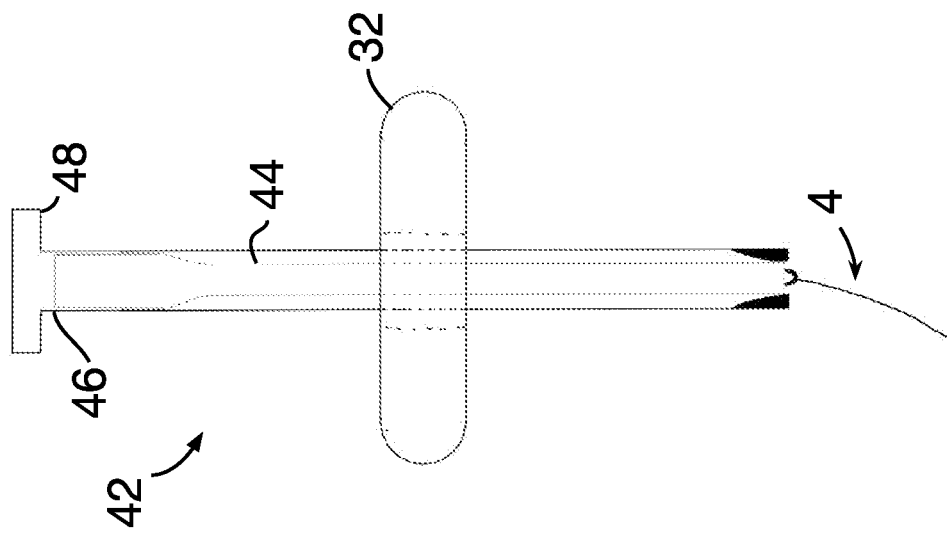
FIGS. 19-20 show details of a system according to a second comparative example.
Figure 20:
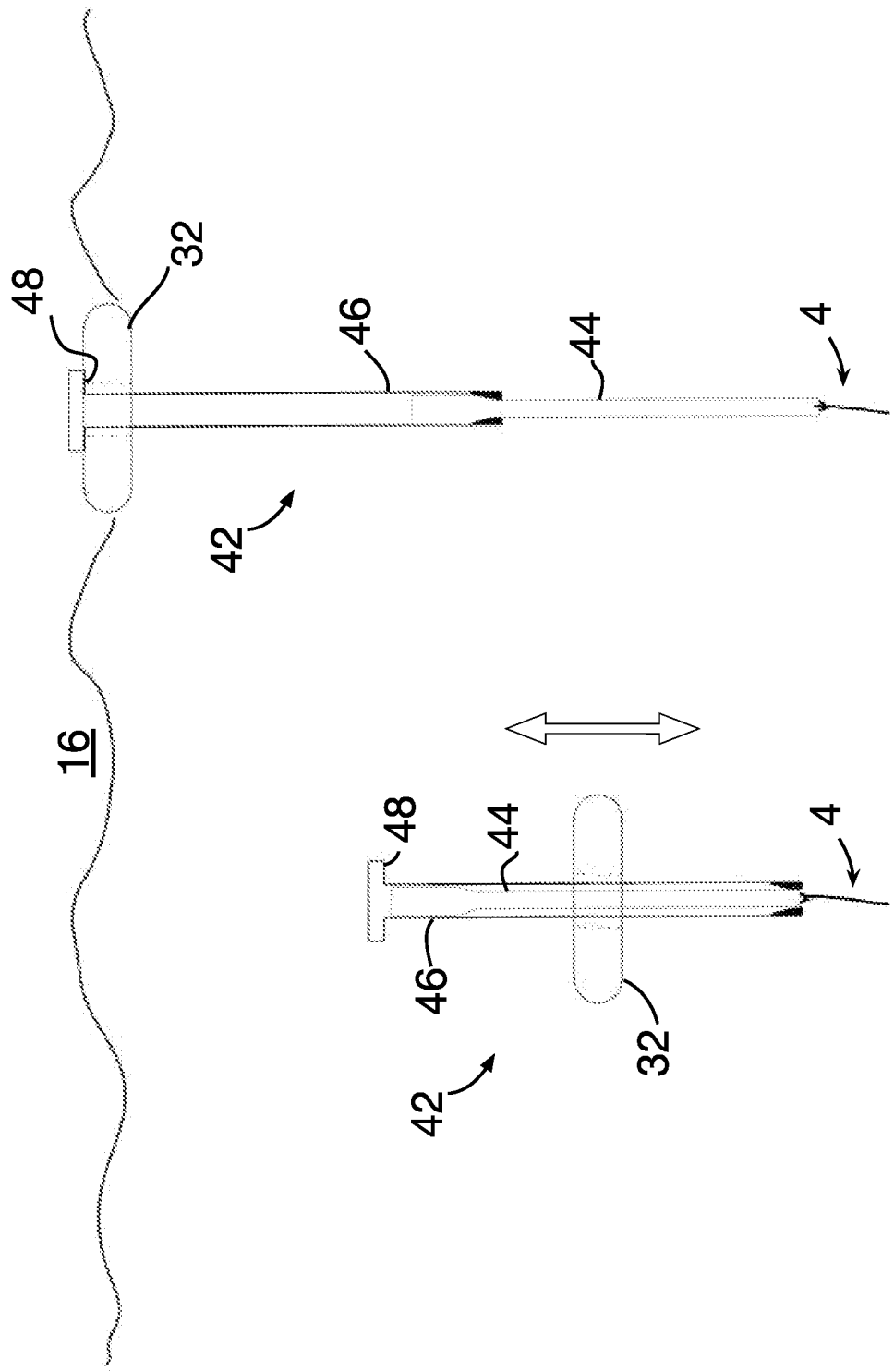

FIGS. 12-14 show an embodiment where the housing 18, including the communication member 22 and optionally also the rest of the control unit 20, does not include its own variable buoyancy member 1. Instead, the O drone 32 also acts as a variable buoyancy member 1 for the communication member 18. In the shown embodiment the O drone 32 has sufficient buoyancy to lift the housing 18 from the submerged position as shown in FIG. 12 and to the surface 16 as shown in FIG. 13. Care should however be taken to ensure that the O drone 32, when decreasing its buoyancy, does not end up with being "trapped" between the buoyancy member 26 and the housing 18, which may happen if the housing 18 and/or upper portion 28 of the tether 4 is too heavy and starts to sink quickly after reducing the buoyancy of the O drone 32. In one embodiment, the upper portion 28 of the tether 4 could be provided with or constituted by telescopic rod or another extendible structure ensuring the O drone 32, upon descending, does not get trapped as illustrated in FIG. 14. An embodiment of such a telescopic rod is shown in FIGS. 19-20 and discussed below.

Figure 15:
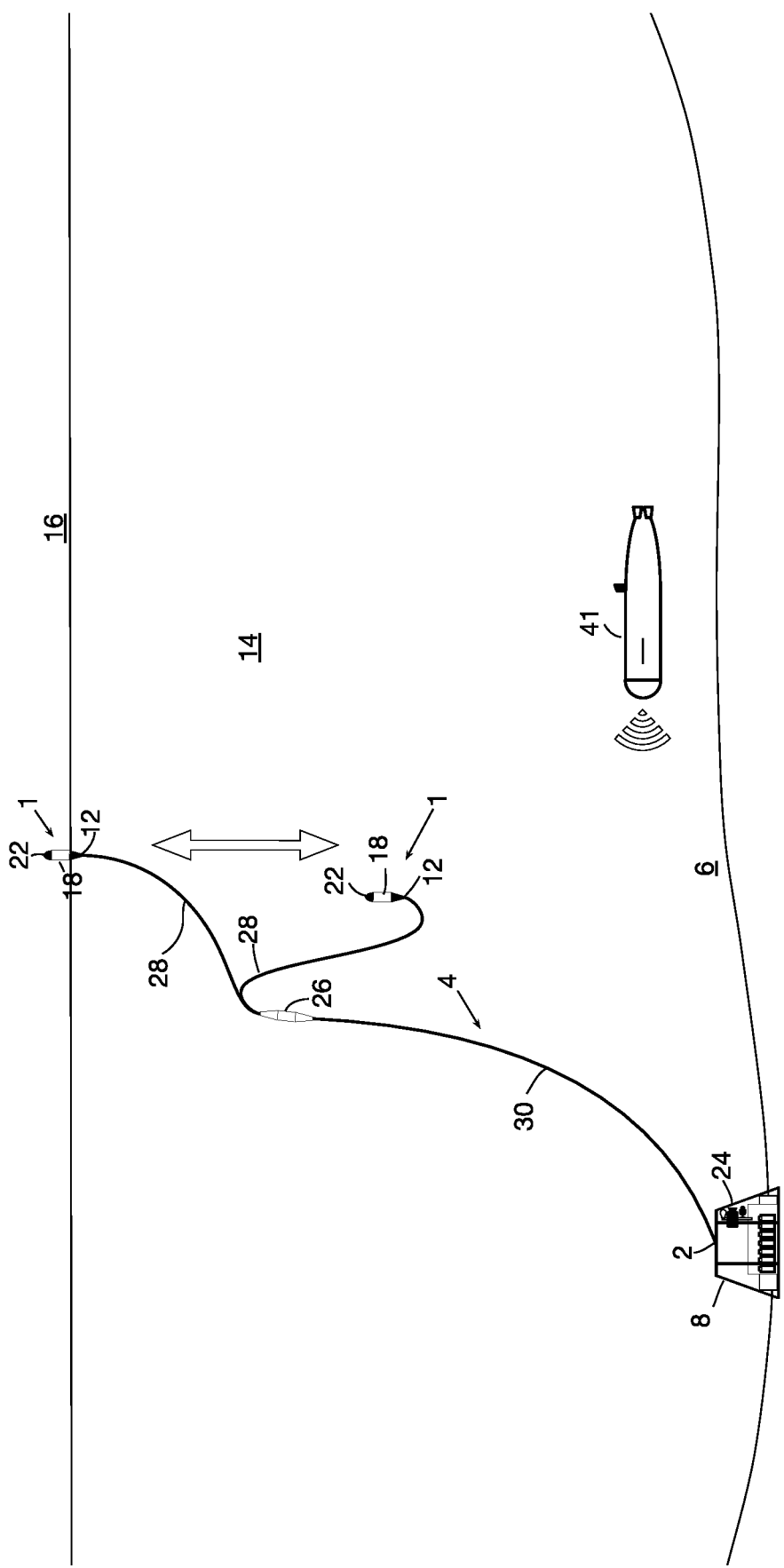
FIG. 15 shows a seventh embodiment of a system according to the invention.

FIG. 15 indicates that the system 10 according to the invention may be used as a communication hub for receiving/sending data from/to external sources, here exemplified by means of an autonomous underwater vehicle (UAV) including 41 a not shown acoustic pinger communicating with the sensor unit at the seabed. One or more sensor unit(s) in the system 10 may be adapted to receive data from the external source. The received data may be communicated wirelessly to the remote recipient by means of the communication member 18 as explained herein and/or the received data may be used as input to the control unit 20 for initiating regulation of buoyancy.

Figure 16:
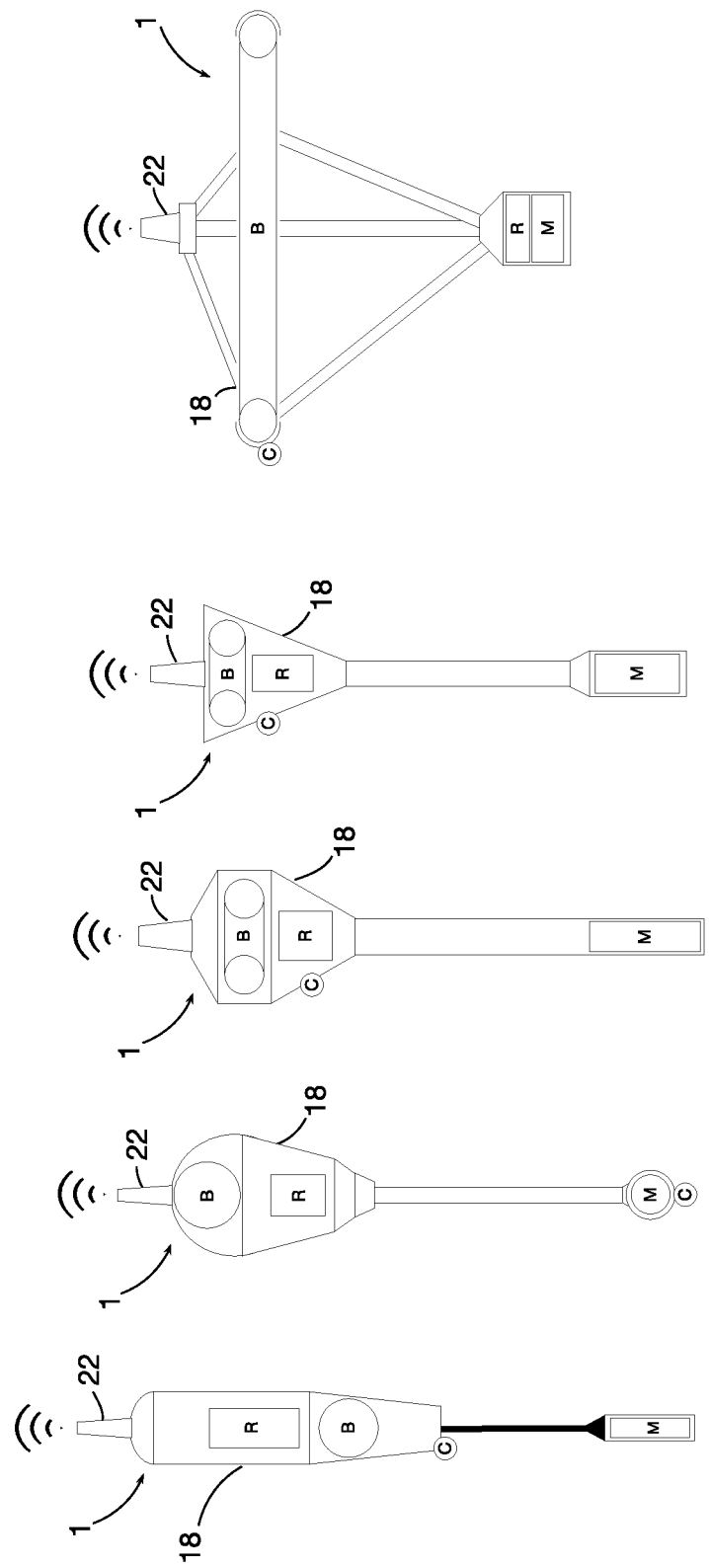
FIG. 16 shows various possible configurations of a variable buoyancy member as may be used in system according to the invention.

FIG. 16 shows various possible geometrical configurations for a housing 18 with a variable buoyancy member 1 therein. The Letter "R" generally refers to a fluid reservoir, while "B" is an external, expandable bladder at least partially exposed to water. "M" refers to a balancing weight that may be included in such a housing to ensure its correct inclination in water. "C" is a connection point for the tether 4. All of the shown geometrical embodiments are eligible to be used in a system 10 according to the invention. The weight M may be provided inside the housing as shown in four out of the five embodiments or it may be suspended from or otherwise connected to the housing 18 as shown in the embodiment to the left.

FIGS. 17 and 18 show an exemplary embodiment of a housing 18 with variable buoyancy member 1 and control unit 20 with communication member 22/transmitter therein. The housing is also provided with a battery pack 42. The connections between the different components of the control unit and its power source are not shown for simplicity. The housing 18 is shown in a side view to the left, while it is shown in a partially cut-away cross-section to the right. The variable buoyancy member 1 includes a reservoir R, here in the form of a pressure canister with hydraulic fluid, and an expandable bladder B, external to the housing. A hydraulic pump 44 is provided for driving fluids between the canister and bladder to regulate the buoyancy of the variable buoyancy member 1 as indicated in FIG. 18.

FIG. 19 shows an embodiment of a telescopic rod 42 as discussed above. The telescopic rod 42 comprises an inner portion 44 and an outer portion 46, where the outer portion 46 is adapted to glide on the inner portion 44 as indicted in FIG. 20. The O drone 32, when increasing its buoyancy, is adapted to climb on the outside of the outer portion/sleeve 46 before coming to abutment against an upper shoulder portion 48 of the outer sleeve. Because of the positive buoyancy of the O drone 32 when climbing, it is adapted to lift the outer sleeve 46 to extend from the inner portion 44 in a telescopic manner. In the shown embodiment, the inner portion 44 is connected to the tether 4. In an alternative, not shown embodiment, the inner portion may instead be provided with the shoulder portion to be allowed to extend/glide upwardly inside the outer sleeve, where the outer sleeve may then be connected to the tether 4. The portion of the telescopic rod 42 (outer portion 46 in FIGS. 19-20) that is adapted to be lifted by the O drone 32 will typically have a negative buoyancy, whereas the portion connected to the tether will have positive buoyancy, ensuring that the O drone 32 does not get "trapped" as shown in FIG. 14 and discussed above.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A system for monitoring subsea parameters, the system being deployable in a water column and comprising:
   a tether with a first end portion to be moored to a seabed;
   a variable buoyancy member connected to the tether at or near a second end of the tether;
   one or more sensor units for sensing one or more subsea parameters; and
   a control unit, the control unit including a communication member for receiving data from the sensor unit(s) and for transmitting said data wirelessly to a remote recipient, the variable buoyancy member being adapted to move the communication member between a submerged position and a surface position for a wireless transmittal of said data, and wherein the control unit is adapted to control the buoyancy of the variable buoyancy member;
   a non-variable buoyancy member connected at an upper portion of the tether, wherein:
   the submerged position of the communication member is below the non-variable buoyancy member.

2. The system according to claim 1, wherein a sensor unit of the one or more sensor units is adapted to be placed at or near a seabed.

3. The system according to claim 1, wherein the tether comprises means for wired data transfer between a sensor unit of the one or more sensor units and the communication member.

4. The system according to claim 1, wherein the communication member and the variable buoyancy member are provided in a common housing.

5. The system according to claim 1, wherein a sensor unit of the one or more sensor units is adapted to move along the tether via a change of buoyancy of the sensor unit.

6. The system according to claim 5, wherein the sensor unit is adapted to move along the tether is adapted to encircle the tether.

7. The system according to claim 1, where a sensor unit of the one or more sensor units is connected to or integrated in the variable buoyancy member.

8. The system according to claim 1, wherein the system, in an idle operation mode, is adapted to keep the communication member at a substantially fixed vertical position below the non-variable buoyancy member in the water column.

9. The system according to claim 1, wherein the tether is provided with one or more buoyancy members along its length between the first end portion and the communication member.

10. The system according to claim 1, wherein the system is deployed in the water column with the first end portion of the tether moored to a seabed.

11. The system according to claim 10, wherein a sensor unit of the one or more sensor units is placed on the seabed and/or wherein the sensor unit is movably arranged along the tether via a change of buoyancy of the sensor unit and/or where the sensor unit is connected to or integrated in the variable buoyancy member.

12. The system according to claim 1, wherein the control unit is adapted to control the buoyancy of the variable buoyancy member in response to one or more of the following parameters:
   time;
   weather conditions;
   subsea parameters sensed via the one or more sensor units; and
   a signal generated externally from the system.

13. A method for monitoring subsea parameters in a water column via a system, wherein the system comprises:
   a tether with a first end portion to be moored to a seabed;
   a variable buoyancy member connected to the tether at or near a second end of the tether;
   one or more sensor units for sensing one or more subsea parameters; and
   a control unit, the control unit including a communication member for receiving data from the sensor unit(s) and for transmitting said data wirelessly to a remote recipient, the variable buoyancy member being adapted to move the communication member between a submerged position and a surface position for a wireless transmittal of said data, and wherein the control unit is adapted to control the buoyancy of the variable buoyancy member;
   a non-variable buoyancy member connected at an upper portion of the tether, wherein:
   the submerged position of the communication member is below the non-variable buoyancy member;
   wherein the method comprises the steps of:
   mooring the first end portion of the tether to a seabed;
   sensing one or more subsea parameters with the sensors unit;
   receiving the data from the sensor unit(s) with the communication member;
   regulating the buoyancy of the variable buoyancy member via the control unit so as to bring the communication member to a surface position in the water column; and
   transmitting the data wirelessly to the remote recipient.

14. The method according to claim 13, the method, after having transmitted data wirelessly to a remote recipient, further comprises the step of:
   reducing the buoyancy of the variable buoyancy member so as to bring the communication member to a position below the surface of the water column.

15. The method according to claim 13, wherein the method includes the step of regulating the buoyancy of the variable buoyancy member in response to one or more of the following parameters:
   time;
   weather conditions;
   subsea parameters sensed via the one or more sensor units; and
   a signal generated externally from the system.

16. The system according to claim 2, wherein the tether comprises means for wired data transfer between the sensor unit and the communication member.

17. The method according to claim 14, wherein the method includes the step of regulating the buoyancy of the variable buoyancy member in response to one or more of the following parameters:
   time;
   weather conditions;
   subsea parameters sensed via the one or more sensor units; and
   a signal generated externally from the system.

* * * * *